US010046731B2

(12) United States Patent
Uchibori et al.

(10) Patent No.: US 10,046,731 B2
(45) Date of Patent: Aug. 14, 2018

(54) ENERGY ABSORPTION APPARATUS, SEATBELT RETRACTOR, AND SEATBELT APPARATUS

(71) Applicant: JOYSON SAFETY SYSTEMS JAPAN K.K., Tokyo (JP)

(72) Inventors: Hayato Uchibori, Tokyo (JP); Daichi Nemoto, Tokyo (JP)

(73) Assignee: JOYSON SAFETY SYSTEMS JAPAN K.K., Tokyo (JP)

( * ) Notice: Subject to any disclaimer, the term of this patent is extended or adjusted under 35 U.S.C. 154(b) by 193 days.

(21) Appl. No.: 15/124,964

(22) PCT Filed: Feb. 23, 2015

(86) PCT No.: PCT/JP2015/054956
§ 371 (c)(1),
(2) Date: Dec. 14, 2016

(87) PCT Pub. No.: WO2015/137101
PCT Pub. Date: Sep. 17, 2015

(65) Prior Publication Data
US 2017/0088093 A1 Mar. 30, 2017

(30) Foreign Application Priority Data
Mar. 12, 2014 (JP) ................. 2014-049447

(51) Int. Cl.
*B60R 22/28* (2006.01)
*B60R 22/34* (2006.01)
*B60R 22/26* (2006.01)

(52) U.S. Cl.
CPC .............. *B60R 22/28* (2013.01); *B60R 22/26* (2013.01); *B60R 22/3413* (2013.01);
(Continued)

(58) Field of Classification Search
CPC ... B60R 22/28; B60R 22/341; B60R 22/3413; B60R 22/34; B60R 2022/285; B60R 2022/288; B60R 2022/289
(Continued)

(56) References Cited

U.S. PATENT DOCUMENTS 6,497,379 B2 * 12/2002 Yano ................... B60R 22/3413
242/379.1
8,262,059 B2  9/2012 Dolenti et al.
(Continued)

FOREIGN PATENT DOCUMENTS

DE  10 2009 010 435 A1  9/2010
DE  10 2008 049 931 B4  3/2012
(Continued)

OTHER PUBLICATIONS

International Search Report issued in International Patent Application No. PCT/JP2015/054956 dated May 26, 2015.

*Primary Examiner* — Keith J Frisby
(74) *Attorney, Agent, or Firm* — Foley & Lardner LLP

(57) ABSTRACT

To provide an energy absorption apparatus, a seatbelt retractor, and a seatbelt apparatus that are capable of changing the energy absorption amount according to increases and decreases in the rotation speed between objects that rotate relative to each other and capable of improving endurance. The energy absorption apparatus includes a first plate connected to one of the objects and having a wave-shaped groove formed in an annular shape, a second plate connected to another one of the objects, disposed so as to be adjacent to the first plate, and having a plurality of radial grooves formed at locations that face the wave-shaped groove, a plurality of driving pins that are inserted, at one end, in the wave-shaped groove and inserted, at another end, in the radial grooves, and a plurality of follower bodies that are
(Continued)

PARTIAL ENLARGED VIEW housed in the wave-shaped groove or the radial grooves and that slide along the wave-shaped groove as the driving pins move.

7 Claims, 10 Drawing Sheets

(52) U.S. Cl.
CPC ... *B60R 2022/285* (2013.01); *B60R 2022/288* (2013.01); *B60R 2022/289* (2013.01)

(58) Field of Classification Search
USPC ........................................ 280/805; 242/379.1
See application file for complete search history.

(56) References Cited

U.S. PATENT DOCUMENTS

| | | |
|---|---|---|
| 8,473,162 B2 | 6/2013 | Jabusch |
| 8,523,140 B2 | 9/2013 | Dolenti et al. |
| 8,529,398 B2 | 9/2013 | Jabusch |
| 9,242,617 B2 | 1/2016 | Singer et al. |
| 2005/0133330 A1 | 6/2005 | Stiefvater |
| 2012/0168548 A1 | 7/2012 | Maemura et al. |
| 2013/0140391 A1 | 6/2013 | Jabusch |
| 2015/0083841 A1 | 3/2015 | Singer et al. |
| 2015/0203070 A1 | 7/2015 | Singer et al. |

FOREIGN PATENT DOCUMENTS

| | | |
|---|---|---|
| DE | 10 2011 008 405 A1 | 7/2012 |
| DE | 10 2011 101 481 A1 | 11/2012 |
| DE | 10 2011 101 517 A1 | 11/2012 |
| DE | 10 2011 101 518 A1 | 11/2012 |
| DE | 10 2011 114 572 A1 | 4/2013 |
| DE | 10 2011 101 516 B4 | 7/2013 |
| DE | 10 2012 010 918 A1 | 12/2013 |
| DE | 10 2010 026 285 B4 | 2/2014 |
| DE | 10 2010 050 189 B4 | 3/2014 |
| DE | 10 2012 214 521 B4 | 3/2014 |
| DE | 10 2013 001 375 A1 | 7/2014 |
| DE | 10 2011 089 203 B4 | 8/2014 |
| DE | 10 2011 101 515 B4 | 8/2014 |
| DE | 10 2013 203 286 A1 | 8/2014 |
| DE | 10 2014 202 498 B3 | 3/2015 |
| DE | 10 2013 220 949 A1 | 4/2015 |
| EP | 1 874 593 B1 | 12/2010 |
| JP | 2013-184538 A | 9/2013 |
| JP | 2015-128925 A | 7/2015 |
| WO | WO-2004/096611 A1 | 11/2004 |
| WO | WO-2007/130041 A1 | 11/2007 |
| WO | WO-2010/139433 A1 | 12/2010 |
| WO | WO-2011/027779 A1 | 3/2011 |
| WO | WO-2012/059166 A1 | 5/2012 |
| WO | WO-2012/156019 A1 | 11/2012 |
| WO | WO-2012/156020 A1 | 11/2012 |
| WO | WO-2013/079150 A1 | 6/2013 |
| WO | WO-2014/131824 A1 | 9/2014 |
| WO | WO-2015/055570 A1 | 4/2015 |
| WO | WO-2015/121159 A1 | 8/2015 |

* cited by examiner

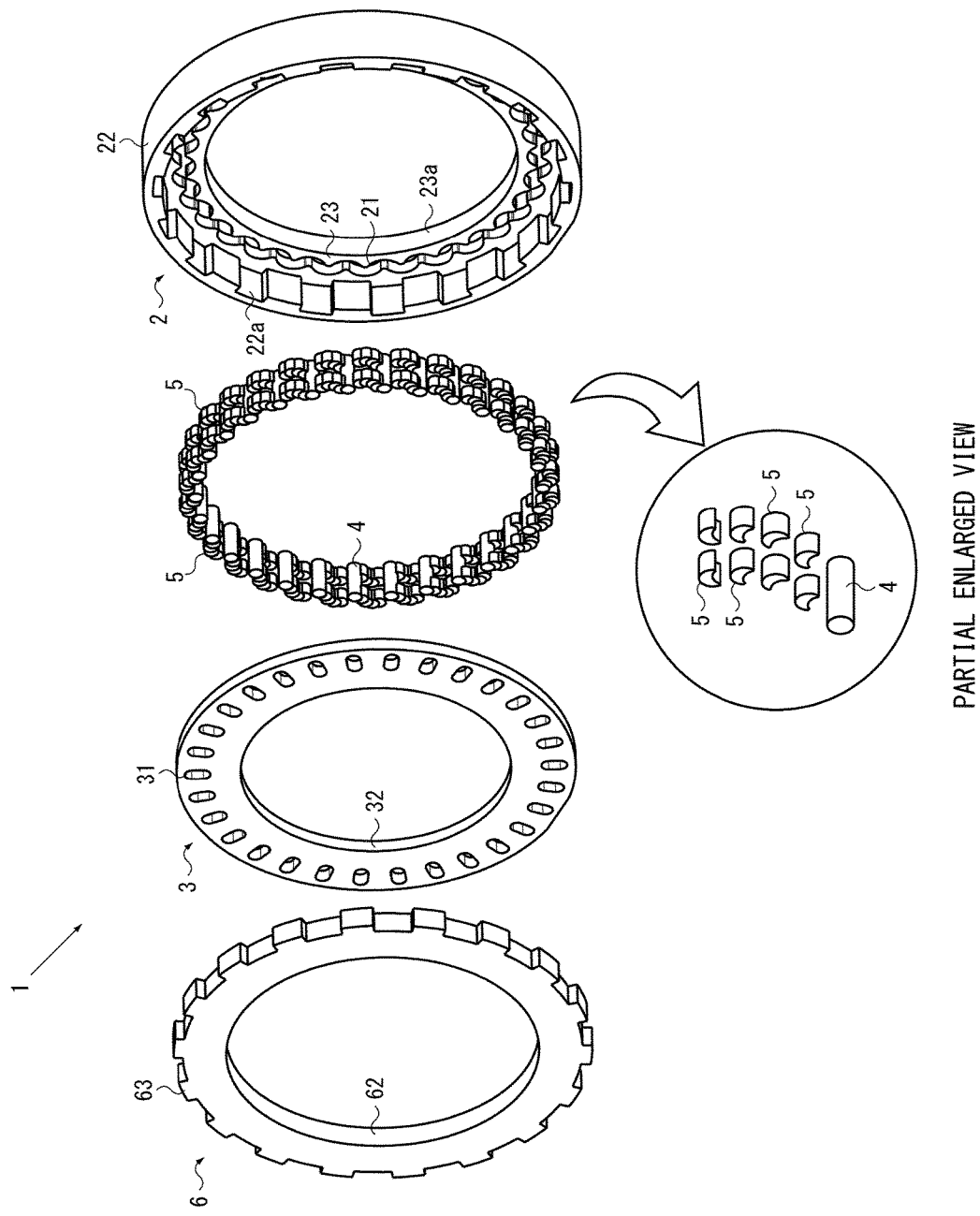

FIG.2(A)
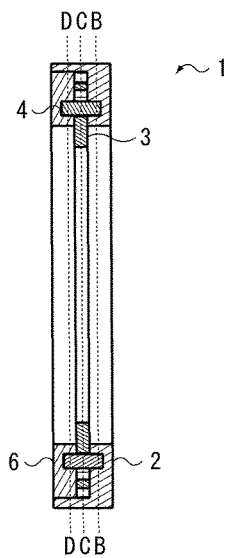
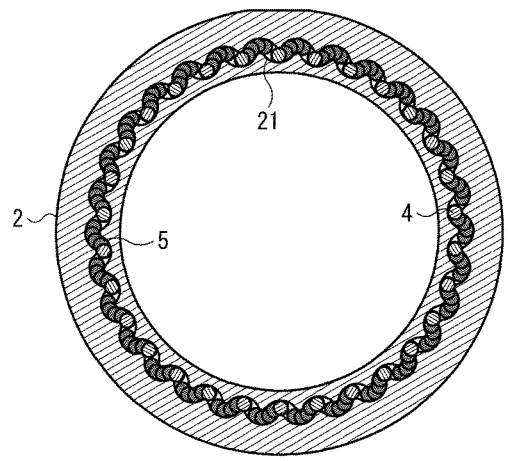
FIG.2(B)
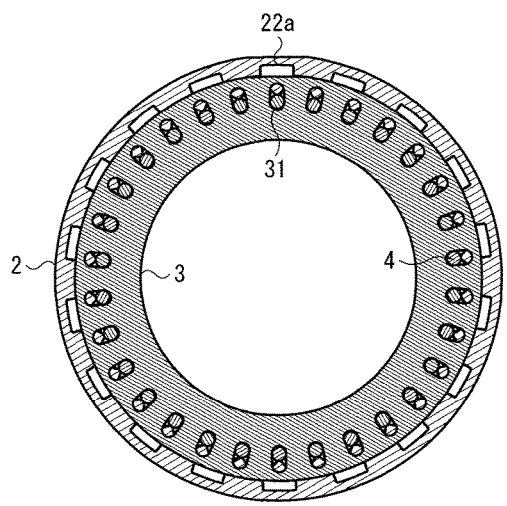
FIG.2(C)
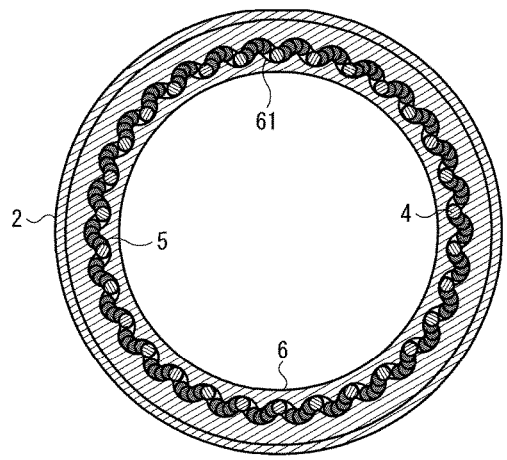
FIG.2(D)

cation No. 2013-184538
PTL 2: International Publication No. 2012/059166

SUMMARY OF THE INVENTION

Technical Problem

With regard to a seatbelt apparatus having a seatbelt retractor that includes an energy absorption apparatus as described in PTL 1 or PTL 2 described above, occupants having various builds, such as men, women, persons with large builds, and persons with small builds, sit on seats of the same vehicle. Therefore, the same seatbelt apparatus can receive different loads that act on the webbing, the retractor, and the like at the time of a vehicle collision.

In order to cope with such varying loads, it is essential to dispose sensors in a vehicle that determine the built of an occupant or dispose an energy absorption apparatus capable of coping with different loads. Incidentally, such a phenomenon is not limited to seatbelt retractors but can also occur, for example, to a retracting apparatus that retracts elongated articles (cloths, steel sheets, and the like) that vary in thickness or kind.

However, in the energy absorption apparatus described in PTL 1, the energy absorption characteristic can be changed between two stages of the wire and the torsion bar but the energy absorption characteristic cannot be steplessly changed.

Furthermore, in the energy absorption apparatus described in PTL 2, the energy absorption amount can be changed according to the rotation speed of the oscillation member so as to cope with occupants of various builds. However, since the oscillation member moves back and forth between the ring discs, there is a problem that when the load that occurs on the entire circumference of the oscillation member becomes uneven, stress concentration occurs so that the oscillation member will likely break down easily. Furthermore, because the oscillation member oscillates while rotating, there is a possibility that, due to reaction force from the ring discs, flexure may occur, and there is a problem that metal fatigue is likely to accumulate leading to inferiority in endurance.

The present invention has been made in view of the foregoing problems. It is an object of the present invention to provide an energy absorption apparatus, a seatbelt retractor, and a seatbelt apparatus that are capable of altering the energy absorption amount according to increases and decreases in the rotation speed of objects that rotate relative to each other and also capable of improving endurance.

Solution to Problem

According to the present invention, there is provided an energy absorption apparatus disposed between objects that rotate relative to each other, the energy absorption apparatus includes a first plate connected to one of the objects and having a wave-shaped groove formed in an annular shape, a second plate connected to another one of the objects, disposed so as to be adjacent to the first plate, and having a plurality of radial grooves formed at locations that face the wave-shaped groove, a plurality of driving pins that are inserted, at one end, in the wave-shaped groove and inserted,

ENERGY ABSORPTION APPARATUS, SEATBELT RETRACTOR, AND SEATBELT APPARATUS

CROSS-REFERENCE TO RELATED APPLICATIONS

The present application is a U.S. national stage application of International Patent Application No. PCT/JP2015/054956, filed Feb. 23, 2015, which claims the benefit of priority to Japanese Patent Application No. 2014-049447, filed Mar. 12, 2014, the entireties of which are hereby incorporated by reference.

TECHNICAL FIELD

The present invention relates to an energy absorption apparatus, a seatbelt retractor, and a seatbelt apparatus and, in particular, relates to an energy absorption apparatus disposed between objects that rotate relative to each other, a seatbelt retractor that includes the energy absorption apparatus, and a seatbelt apparatus that includes the seatbelt retractor.

BACKGROUND ART

For example, in a retracting apparatus (including a rewinding function) for an elongated article having a belt shape or a string shape, a winding drum (sometimes called drum or spool) that retracts the elongated article rotates relative to a support unit that rotatably supports the winding drum. As for the apparatus that undergoes such relative motion, in the case where the elongated article is entirely extended or the case where the winding drum stops during retracting or rewinding, large load acts on the apparatus and the elongated article; therefore, it is preferable that an energy absorption apparatus be disposed between objects that undergo relative motion. As an example of such retracting apparatuses, a seatbelt retractor for use in a seatbelt apparatus is a representative example (refer to, for example, PTL 1 or PTL 2).

PTL 1 discloses a seatbelt retractor in which a torsion bar and a wire are disposed between a retraction drum and a ratchet gear that rotate relative to each other. According to that seatbelt retractor, energy that can occur between the retractor drum and the ratchet gear because of torsional deformation of the torsion bar and sliding deformation of the wire is able to be absorbed, and an energy absorption characteristic is able to be changed by varying the withdraw load necessary to cause the wire to undergo sliding deformation.

PTL 2 discloses a force limiter apparatus for a vehicle in which ring discs (1, 3) and an oscillation member (2) are disposed between objects that rotate relative to each other. According to that apparatus, when the oscillation member (2) rotates relative to the ring discs (1, 3), projections (5) formed on the oscillation member (2) contact projections (7, 8) formed on the ring discs (1, 3) while alternately oscillating, whereby energy that occurs between the objects that rotate relative to each other is able to be absorbed. Particularly, in this apparatus, the kinetic energy changes depending on the rotation speed of the oscillation member (2), and the energy absorption amount can be increased as the rotation speed of the oscillation member (2) increases.

CITATION LIST

Patent Literature

PTL 1: Japanese Unexamined Patent Application Publiat another end, in the radial grooves, and a plurality of follower bodies that are housed in the wave-shaped groove or the radial grooves and that slide along the wave-shaped groove or the radial grooves as the driving pins move.

The follower bodies housed in the wave-shaped groove may be a single component part or a plurality of component parts filling space between the driving pins. Furthermore, the follower bodies may have a cross section with a crescent shape. Furthermore, the follower bodies housed in the radial grooves may be component parts having a hexahedral shape that are fixed to the driving pins.

Still further, the energy absorption apparatus may further include a third plate that is fixed to the first plate so that the second plate is sandwiched and that has an auxiliary wave-shaped groove that is disposed so as to have the same shape and the same phase as the wave-shaped groove. The second plate is formed so that the radial grooves may extend through the second plate. The driving pins, at another end, may extend through the radial grooves and may be inserted into the auxiliary wave-shaped groove. The follower bodies may be housed in both the wave-shaped groove and the auxiliary wave-shaped groove.

Furthermore, according to the present invention, there is provided a seatbelt retractor including a spool that retracts a webbing for restraining an occupant and a base frame that rotatably retains the spool, the seatbelt retractor including an energy absorption apparatus disposed between the base frame or a component part fixed to the base frame and the spool, wherein the energy absorption apparatus is the energy absorption apparatus according to the present invention described above.

Furthermore, according to the present invention, there is provided a seatbelt apparatus that includes a webbing that restrains an occupant, a seatbelt retractor that retracts the webbing, a belt anchor that fixes the webbing to a vehicle body side, a buckle disposed on a side surface of the seat, and a tongue disposed on the webbing, wherein the seatbelt retractor is the seatbelt retractor that includes the energy absorption apparatus according to the present invention described above.

Advantageous Effects of the Invention

According to the energy absorption apparatus, the seatbelt retractor, and the seatbelt apparatus according the present invention described above, the driving pins are moved along the wave-shaped groove by the second plate rotationally moving relative to the first plate and this movement of the driving pins causes the follower bodies to slide along the wave-shaped groove or the radial grooves, so that the follower bodies can be caused to produce inertial force and friction force. Furthermore, due to the foregoing constructions, increases or decreases in the relative rotation speed of the second plate increase or decrease the sliding speed of the follower bodies, so that the inertial force and the friction force accordingly increase or decrease. Therefore, the energy absorption amount can be changed according to increases and decreases in the rotation speed between the objects that rotate relative to each other.

Furthermore, in the present invention, energy that occurs between the objects that rotate relative to each other is absorbed by converting the energy into inertial force and friction force that are produced by the sliding of the follower bodies. Therefore, there is no object that moves in a direction of an axis, so that, structurally, the strength can easily be improved and the endurance of the energy absorption apparatus can be improved. Still further, because functions are divided to the component parts that rotate (the first plate and the second plate) and the component parts (the follower bodies), the reaction force that occurs at the time of driving can be dispersed to individual component parts, so that accumulation of metal fatigue can be reduced and endurance can be improved.

BRIEF DESCRIPTION OF THE DRAWINGS

FIG. 1 is development view of component parts, showing an energy absorption apparatus according to a first embodiment of the present invention.

FIG. 2 is an assembly view of the component parts of the energy absorption apparatus shown in FIG. 1, in which FIG. 2(A) showing a sectional diagram taken on a plane that contains a rotation axis, FIG. 2(B) showing a B-B sectional diagram of FIG. 2(A), FIG. 2(C) showing a C-C sectional diagram of FIG. 2(A), and FIG. 2(D) showing a D-D sectional diagram of FIG. 2(A).

DESCRIPTION OF THE EMBODIMENTS

Figure 3A:
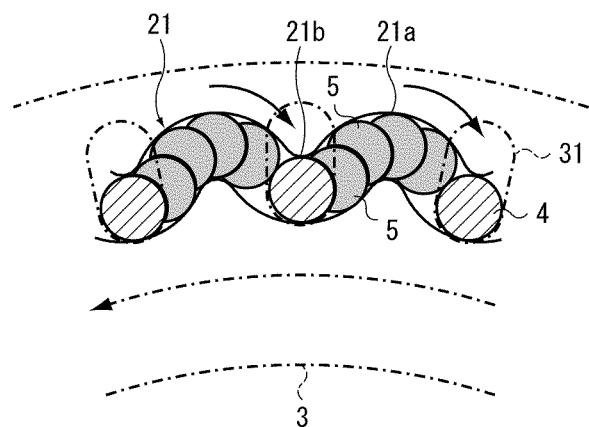
FIG. 3 is a diagram illustrating operation of the energy absorption apparatus shown in FIG. 1, in which FIG. 3(A) showing a state in which driving pins are located in trough portions and FIG. 3(B) showing a state in which the driving pins are located in crest portions.

Hereinafter, embodiments of the present invention will be described with reference to FIG. 1 to FIG. 10. Herein, FIG. 1 is a development view of component parts, showing an energy absorption apparatus according to a first embodiment of the present invention. FIG. 2 is a diagram of an assembly of the component parts of the energy absorption apparatus shown in FIG. 1, FIG. 2(A) showing a sectional diagram taken on a plane that contains a rotation axis, FIG. 2(B) showing a B-B sectional diagram of FIG. 2(A), FIG. 2(C) showing a C-C sectional diagram of FIG. 2(A), and FIG. 2(D) showing a D-D sectional diagram of FIG. 2(A).

An energy absorption apparatus 1 according to the first embodiment of the present invention, as shown in FIG. 1 and FIG. 2, is an energy absorption apparatus that is disposed between objects that rotate relative to each other, and includes a first plate 2 connected to one of the objects and having a wave-shaped groove 21 formed in an annular shape, a second plate 3 connected to the other object, disposed so as to be adjacent to the first plate 2, and having a plurality of radial grooves 31 that are formed at locations that face the wave-shaped groove 21, a plurality of driving pins 4 that are inserted, at one end, in the wave-shaped groove 21 and inserted, at the other end, in the radial grooves 31, and a plurality of follower bodies 5 that are housed in the wave-shaped groove 21 or the radial grooves 31 and that slide along the wave-shaped groove 21 as the driving pins 4 move.

Furthermore, the energy absorption apparatus 1 shown in the figure has a third plate 6 that is fixed to the first plate 2 so that the second plate 3 is sandwiched therebetween and that has an auxiliary wave-shaped groove 61 that is disposed so as to have the same shape and the same phase as the wave-shaped groove 21. As for the second plate 3, the radial grooves 31 are formed so as to extend through the second plate 3. As for the driving pins 4, the other-end portions thereof extend through the radial grooves 31 and are inserted into the auxiliary wave-shaped groove 61. The follower bodies 5 are housed in both the wave-shaped groove 21 and the auxiliary wave-shaped groove 61.

The first plate 2 has, for example, a tubular side wall portion 22 and an annular flat surface portion 23 formed on an inner side of an end of the side wall portion 22. On the other end of the side wall portion 22, a plurality of key grooves 22a for engagement with the third plate 6 are formed on a periphery. In this embodiment, the first plate 2 also has a function as a casing that houses the second plate 3, the driving pins 4, and the follower bodies 5. The first plate 2 may be made of metal or resin.

In a surface of the flat surface portion 23 which is adjacent to the second plate 3, the wave-shaped groove 21 is formed as shown in FIG. 1 and FIG. 2(B). The wave-shaped groove 21 is a groove formed so as to meander in a circumferential direction of the first plate 2. Incidentally, as long as the first plate 2 in this embodiment has the wave-shaped groove 21 and the key grooves 22a, the side wall portion 22 may have a shape other than a cylindrical shape, and an opening portion 23a formed in the flat surface portion 23 may be omitted.

The second plate 3 is, for example, an annular flat plate member that has, in its central portion, an opening portion 32. The opening portion 32 can be omitted. The second plate 3 may be made of metal or resin. Furthermore, the second plate 3 has a plurality of radial grooves 31 that are formed and elongated in radial directions. Incidentally, in the embodiment shown in figures, the number of the radial grooves 31 is the same as the number of the driving pins 4. By adjusting the numbers of the driving pins 4 and the follower bodies 5 that correspond to the radial grooves 31, the energy absorption amount can be adjusted.

The radial grooves 31 in this embodiment are formed to extend through obverse and reverse sides. The length of the radial grooves 31 in the radial direction is set to a size that is greater than or equal to the amplitude that the driving pins 4 generate when moving along the wave-shaped groove 21. Furthermore, the width of the radial grooves 31 in the circumferential direction is set to a size that allows insertion of the driving pins 4. Furthermore, the radial grooves 31 are each formed so that an end portion thereof at a radially inward side faces a trough portion of the wave-shaped groove 21 and an end portion of each radial groove 31 at a radially outward side faces a crest portion of the wave-shaped groove 21.

The third plate 6 is, for example, an annular flat plate member that has in its central portion an opening portion 62. On an outer periphery of the third plate 6 there are formed a plurality of projections 63 that are fitted to the key grooves 22a of the first plate 2. The opening portion 62 can be omitted. The third plate 6 may be made of metal or resin. Furthermore, as shown in FIG. 2(D), in a surface that is adjacent to the second plate 3, the auxiliary wave-shaped groove 61 is formed in the same shape and the same phase as the wave-shaped groove 21 of the first plate 2. That is, the auxiliary wave-shaped groove 61 has the same amplitude as the wave-shaped groove 21 and is formed so that crest portions and trough portions of the auxiliary wave-shaped groove 61 coincide with those of the wave-shaped groove 21.

Each driving pin 4 is a cylinder-shaped component part an end of which is inserted into the wave-shaped groove 21 of the first plate 2 and the other end of which is inserted into the auxiliary wave-shaped groove 61 of the third plate 6 and, as shown in FIG. 2(C), intermediate portion of which is inserted in a radial groove 31 of the second plate 3. The driving pin 4 may be made of metal or resin.

Each follower body 5 is a columnar component part which is inserted into the wave-shaped groove 21 and the auxiliary wave-shaped groove 61. As shown in the partial enlarged diagram in FIG. 1, each follower body 5 has a crescent-shaped cross section. Then, as shown in FIG. 2(B), a plurality of follower bodies 5 are disposed so as to fill spaces between the driving pins 4. The follower bodies 5 may be made of metal or resin.

Furthermore, the follower bodies 5 are not limited to the graphically shown shape, as long as the follower bodies 5 can be housed within the wave-shaped groove 21 and the auxiliary wave-shaped groove 61 that meander and the follower bodies 5 can be pushed to move along the grooves by the driving pins 4. For example, the follower bodies 5 may have a spherical shape, may have a half-moon shape, and may have a block shape. Furthermore, the follower bodies 5 have a rod shape so as to be movable while deforming along the shape of the grooves.

In the energy absorption apparatus 1 having the foregoing construction, the third plate 6 is fixed to the first plate 2 and, in between, the second plate 3 is supported by the driving pins 4. Therefore, an assembly of the first plate 2 and the third plate 6, and the second plate 3 are configured to be relatively rotationally movable.

Figure 3B:
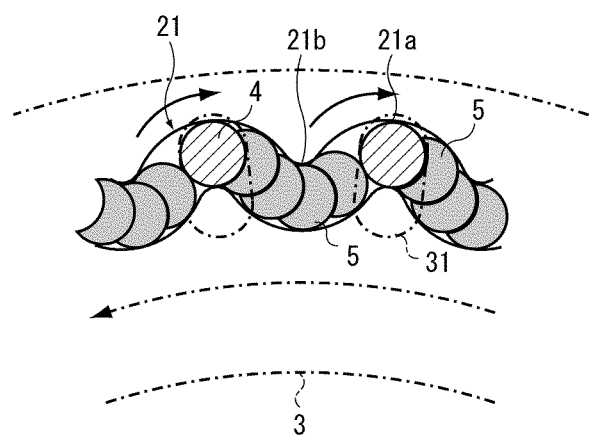
Figure 4:
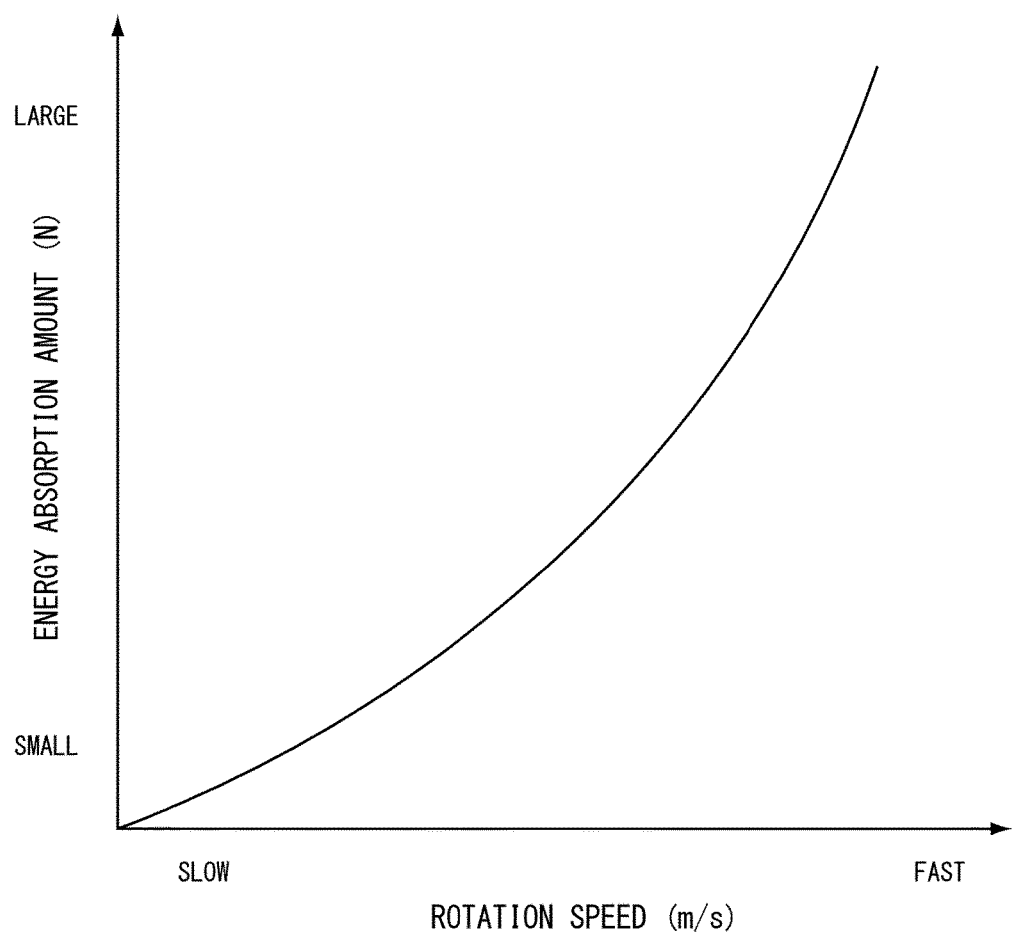
FIG. 4 is a diagram showing a relationship between the rotation speed and the energy absorption amount.

Note that FIG. 3 is a diagram showing operation of the energy absorption apparatus shown in FIG. 1, FIG. 3(A) showing a state in which driving pins are located in trough portions and FIG. 3(B) showing a state in which driving pins are located in crest portions. In each diagram, for convenience of illustration, the second plate 3 is shown by a one-dot chain line. Furthermore, FIG. 4 is a diagram showing the relationship between the rotation speed and the energy absorption amount.

As shown in FIG. 3(A), the wave-shaped groove 21 has crest portions 21a that are projected radially outwards and trough portions 21b that are projected radially inwards. Now, the case where there occurs a transition from a state in which the driving pins 4 are located in the trough portions 21b of the wave-shaped groove 21 as shown in FIG. 3(A) to a state in which the driving pins 4 are located in the crest portions 21a as shown in FIG. 3(B) will be described.

When, from the state shown in FIG. 3(A), the second plate 3 rotates relative to the first plate 2 in the direction of an arrow shown by a one-dot chain line in each diagram, the driving pins 4 move along the wave-shaped groove 21 because the driving pins 4 are inserted in the radial grooves 31 of the second plate 3. Then, as the driving pins 4 move, the follower bodies 5 are pressed to move within the wave-shaped groove 21.

As the driving pins 4 move along the wave-shaped groove 21, the driving pins 4 move back and forth between a radially inward end and a radially outward end within the radial grooves 31. Then, as shown in FIG. 3(B), in the state in which the driving pins 4 are located in the crest portions 21a of the wave-shaped groove 21, the driving pins 4 are located at the radially outward end within the radial grooves 31.

The follower bodies 5 slide within the wave-shaped groove 21 as the driving pins 4 move. At this time, the follower bodies 5 are pressed against an internal surface of the wave-shaped groove 21 and produce friction force. Because of this friction force, energy occurring between the first plate 2 and the second plate 3 can be absorbed. Note that although the case where the second plate 3 rotates has been described herein, substantially the same operation occurs in the case where the first plate 2 rotates.

In the energy absorption apparatus 1 according to the first embodiment described above, when the relative rotation speed between the first plate 2 and the second plate 3 becomes high, the speed of the follower bodies 5 accordingly increases and kinetic energy of the second plate 3 is converted into inertial force of the follower bodies 5. Furthermore, when the follower bodies 5 move within the wave-shaped groove 21, the follower bodies 5 are pressed against wall surfaces of the casing, so that the normal reaction N that occurs on the follower bodies 5 increases and the friction force ($F=\mu N$) also increases.

As a result, kinetic energy that occurs due to the relative rotational motion of the first plate 2 and the second plate 3 can be converted into inertial force and friction force that occur due to movements of the follower bodies 5 and therefore kinetic energy of the second plate 3 can be absorbed. Furthermore, in this embodiment, there is no object that moves in the direction of an axis, so that, structurally, the strength can be easily improved and the endurance of the energy absorption apparatus can be improved.

In particular, in the energy absorption apparatus 1 according to this embodiment, the energy absorption amount (N) can be altered with respect to the relative rotation speed (m/s) as indicated in FIG. 4, the energy absorption amount can be made small in the case where the rotation speed is low, and the energy absorption amount can be made large in the case where the rotation speed is high.

Incidentally, although in FIG. 4, the energy absorption amount relative to the rotation speed is shown by a quadratic curve along which the energy absorption amount increases as the acceleration of the rotation speed increases, the energy absorption amount may have a proportional relation to the rotation speed in which the energy absorption amount increases as the rotation speed increases.

Figure 5:
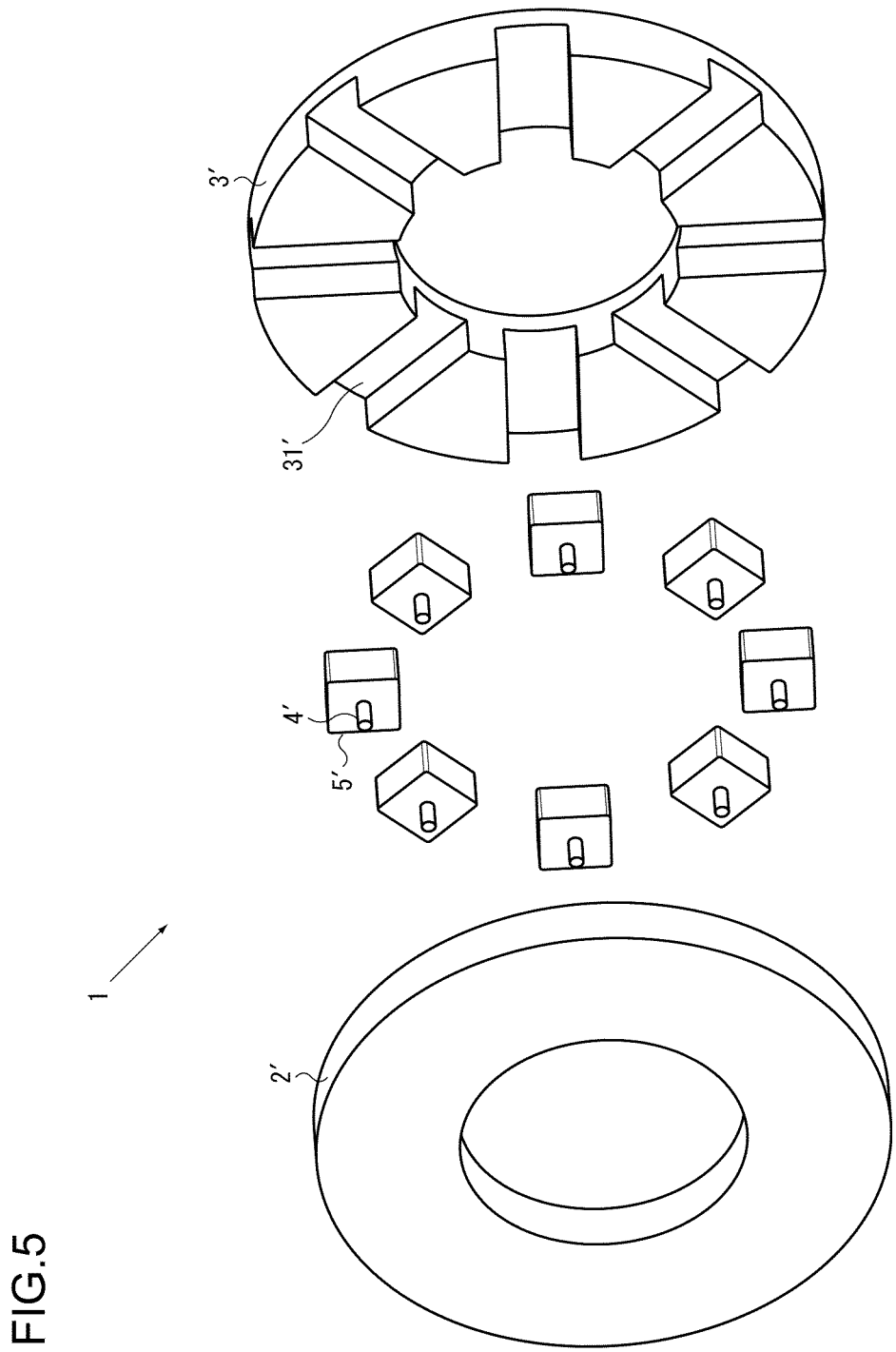
FIG. 5 is a development view of component parts, showing an energy absorption apparatus according to a second embodiment of the present invention.
Figure 6A:
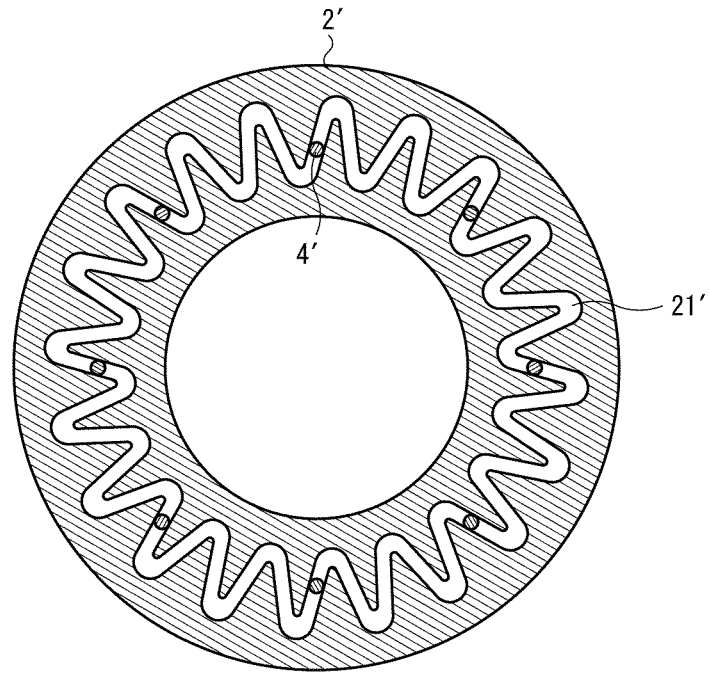
FIG. 6 is a diagram showing an assembled state of the component parts of the energy absorption apparatus shown in FIG. 5, in which FIG. 6(A) showing a sectional diagram taken on a plane perpendicular to a rotation axis of a first plate and FIG. 6(B) showing a sectional diagram taken on a plane perpendicular to a rotation axis of a second plate.
Figure 6B:
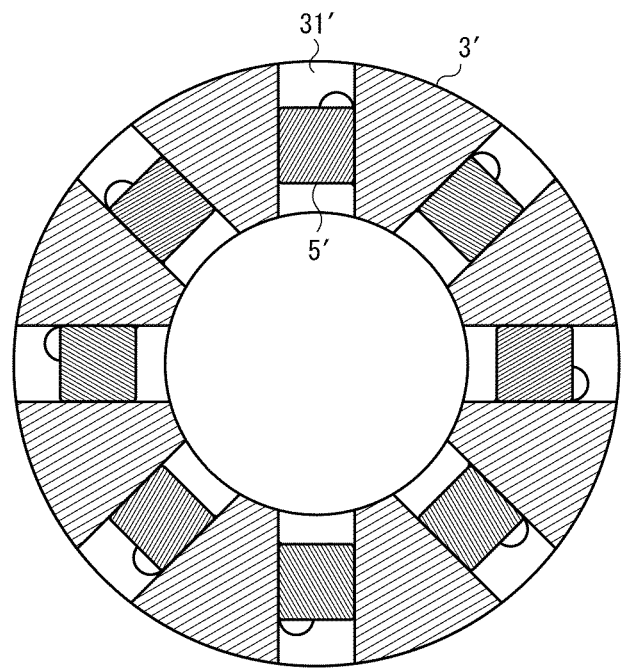
Figure 7:
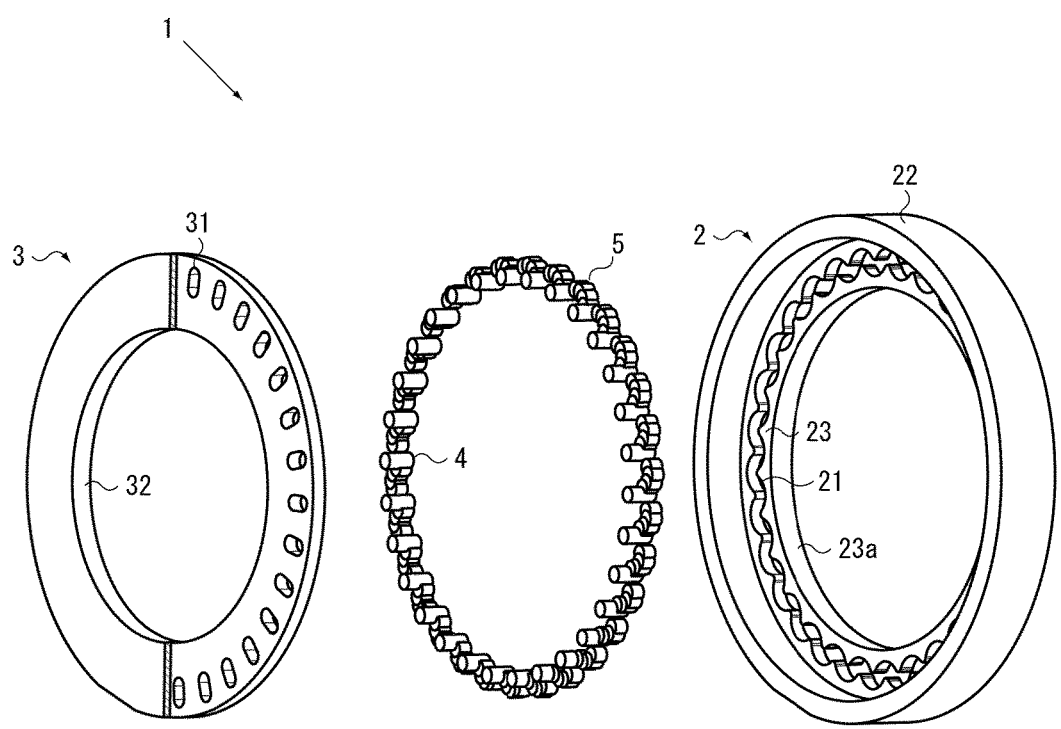
FIG. 7 is a development view of component parts, showing an energy absorption apparatus according to a third embodiment of the present invention.

Next, energy absorption apparatuses according to other embodiments of the present invention will be described with reference to FIGS. 5 to 7. Note that FIG. 5 is a development view of component parts, showing an energy absorption apparatus according to a second embodiment of the present invention. FIG. 6 is a diagram showing an assembled state of the component parts of the energy absorption apparatus shown in FIG. 5, FIG. 6(A) showing a sectional diagram taken on a plane perpendicular to a rotation axis of a first plate and FIG. 6(B) showing a sectional diagram taken on a plane perpendicular to a rotation axis of a second plate. FIG. 7 is a development view of component parts, showing an energy absorption apparatus according to a third embodiment of the present invention.

An energy absorption apparatus 1 according to the second embodiment, as shown in FIG. 5 and FIGS. 6(A) and (B), includes a first plate 2' connected to one of objects and having a wave-shaped groove 21' formed in an annular shape, a second plate 3' connected to the other object, disposed so as to be adjacent to the first plate 2', and having a plurality of radial grooves 31' that are formed at locations that face the wave-shaped groove 21', a plurality of driving pins 4' that are inserted, at one end, in the wave-shaped groove 21' and inserted, at the other end, in the radial grooves 31', and a plurality of follower bodies 5' that are housed in the radial grooves 31' and that slide along the radial grooves 31' as the driving pins 4' move.

The first plate 2' is an annular flat plate member and, in a surface thereof that is adjacent to the second plate 3' the wave-shaped groove 21' is formed as shown in FIG. 6(A). End portions of the driving pins 4' are inserted in the wave-shaped groove 21'. Besides, the first plate 2' may be a casing that rotatably houses the second plate 3'. Incidentally, the first plate 2' and the second plate 3' are connected so as not to move in the directions of an axis with respect to the objects to which the first plate 2' and the second plate 3' rotate relative to each other.

The second plate 3' is an annular flat plate member and, on a surface thereof that is adjacent to the first plate 2', the radial grooves 31' are formed as shown in FIG. 6(B). The follower bodies 5' are inserted in the radial grooves 31'. As shown in FIG. 5, the radial grooves 31' have, for example, a shape that is obtained by cutting off portions of the second plate 3' in radial directions.

The follower bodies 5' are, for example, component parts having a hexahedral shape (for example, a cube, a rectangular parallelepiped, and the like) that are fixed to the driving pins 4'. However, as long as the follower bodies 5' are of a shape such that the follower bodies 5' are pressed against the radial grooves 31' to easily produce friction force, the follower bodies 5' are not limited to the graphically shown shape. Furthermore, the driving pins 4' and the follower bodies 5' may be formed together as units or may also be engaged together by inserting the driving pins 4' into holes formed in the follower bodies 5'.

According to the energy absorption apparatus 1 according to the second embodiment, when, for example, the first plate 2' rotates relative to the second plate 3', the driving pins 4' move along the wave-shaped groove 21'. Simultaneously, the follower bodies 5' fixed to the driving pins 4' move back and forth in radial directions within the radial grooves 31', so that the inertial force increases. At this time, the follower bodies 5' are pressed against internal surfaces of the radial grooves 31' (the second plate 3'), so that friction force occurs. Because of the forgoing inertial force and friction force, energy that occurs between the first plate 2' and the second plate 3' can be absorbed.

The energy absorption apparatus 1 according to the third embodiment is an energy absorption apparatus in which the third plate 6 described in conjunction with the first embodiment has been omitted. Specifically, the energy absorption apparatus 1 according to the third embodiment of the present invention, as shown in FIG. 7, includes a first plate 2 connected to one of the objects and having a wave-shaped groove 21 formed in an annular shape, a second plate 3 connected to the other object, disposed so as to be adjacent to the first plate 2, and having a plurality of radial grooves 31 that are formed at locations that face the wave-shaped groove 21, a plurality of driving pins 4 that are inserted, at one end, in the wave-shaped groove 21 and inserted, at the other end, in the radial grooves 31, and a plurality of follower bodies 5 that are housed in the wave-shaped groove 21 and that slide along the wave-shaped groove 21 as the driving pins 4 move.

The radial grooves 31 formed in the second plate 3 do not extend through the obverse and reverse sides but are formed only in a surface that is adjacent to the first plate 2. In FIG. 7, for convenience of illustration, a portion of the first plate 2 has been cut out to clearly show the radial grooves 31. Furthermore, other constructions are substantially the same as those of the first embodiment and, therefore, detailed descriptions thereof will be omitted.

According to the energy absorption apparatus 1 according to the third embodiment, for example, when the second plate 3 rotates relative to the first plate 2, an end of each driving pin 4 moves along the wave-shaped groove 21 and the other end of each driving pin 4 moves along one of the radial grooves 31. Simultaneously, the follower bodies 5 slide along the wave-shaped groove 21, so that the inertial force increases. At this time, the follower bodies 5 are pressed against internal surfaces of the wave-shaped groove 21 (the first plate 2), so that friction force occurs. Because of the foregoing inertial force and friction force, energy that occurs between the first plate 2 and the second plate 3 can be absorbed.

Figure 8:
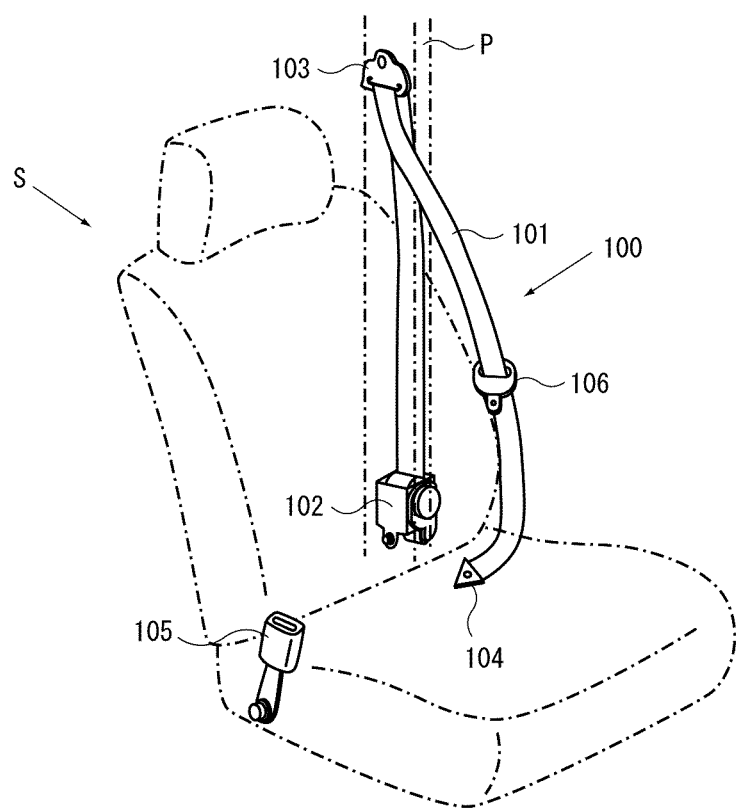
FIG. 8 is an overall construction diagram showing a seatbelt apparatus according to the embodiment.
Figure 9:
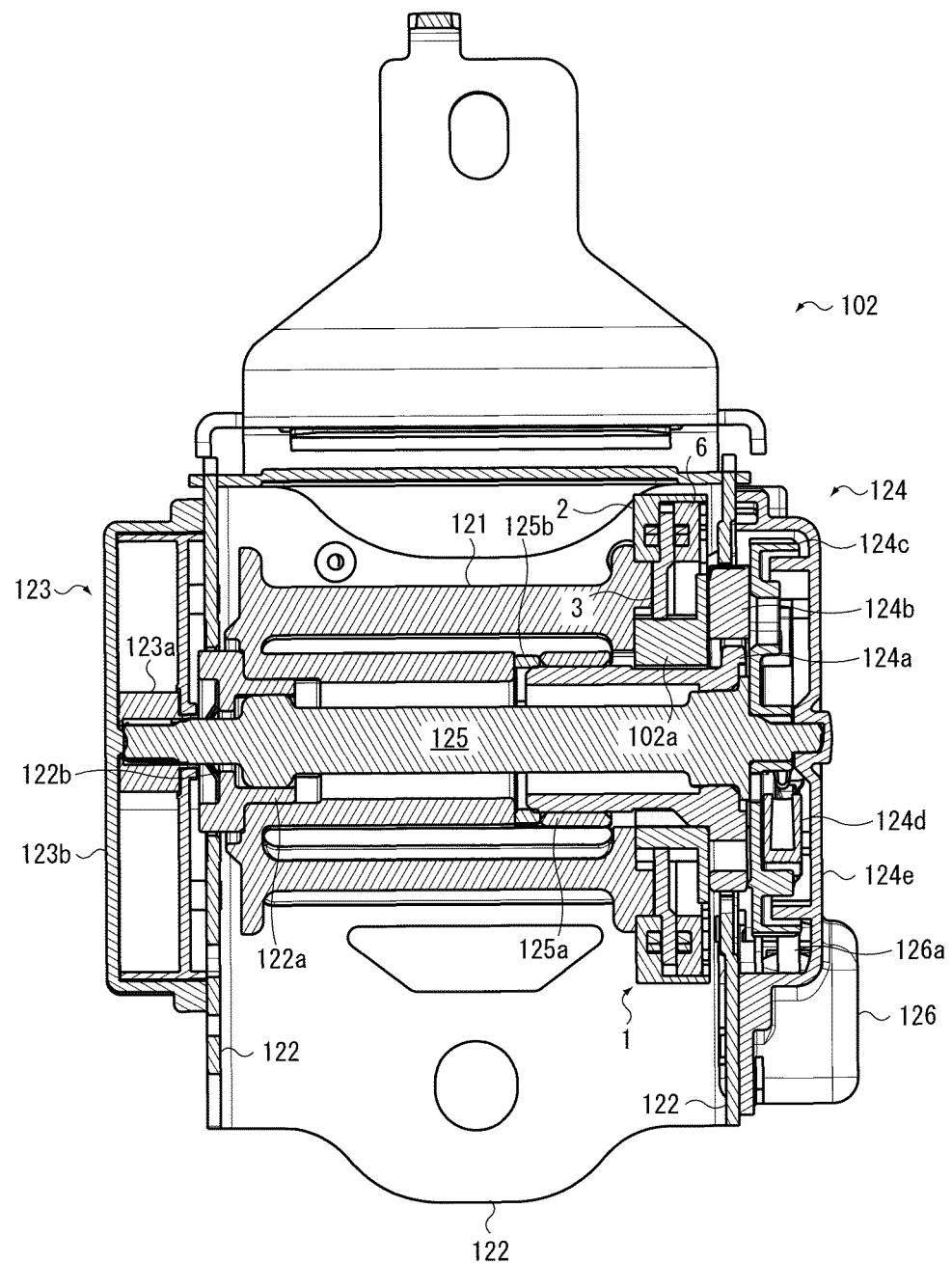
FIG. 9 is a sectional diagram of a seatbelt retractor according to the embodiment.
Figure 10:
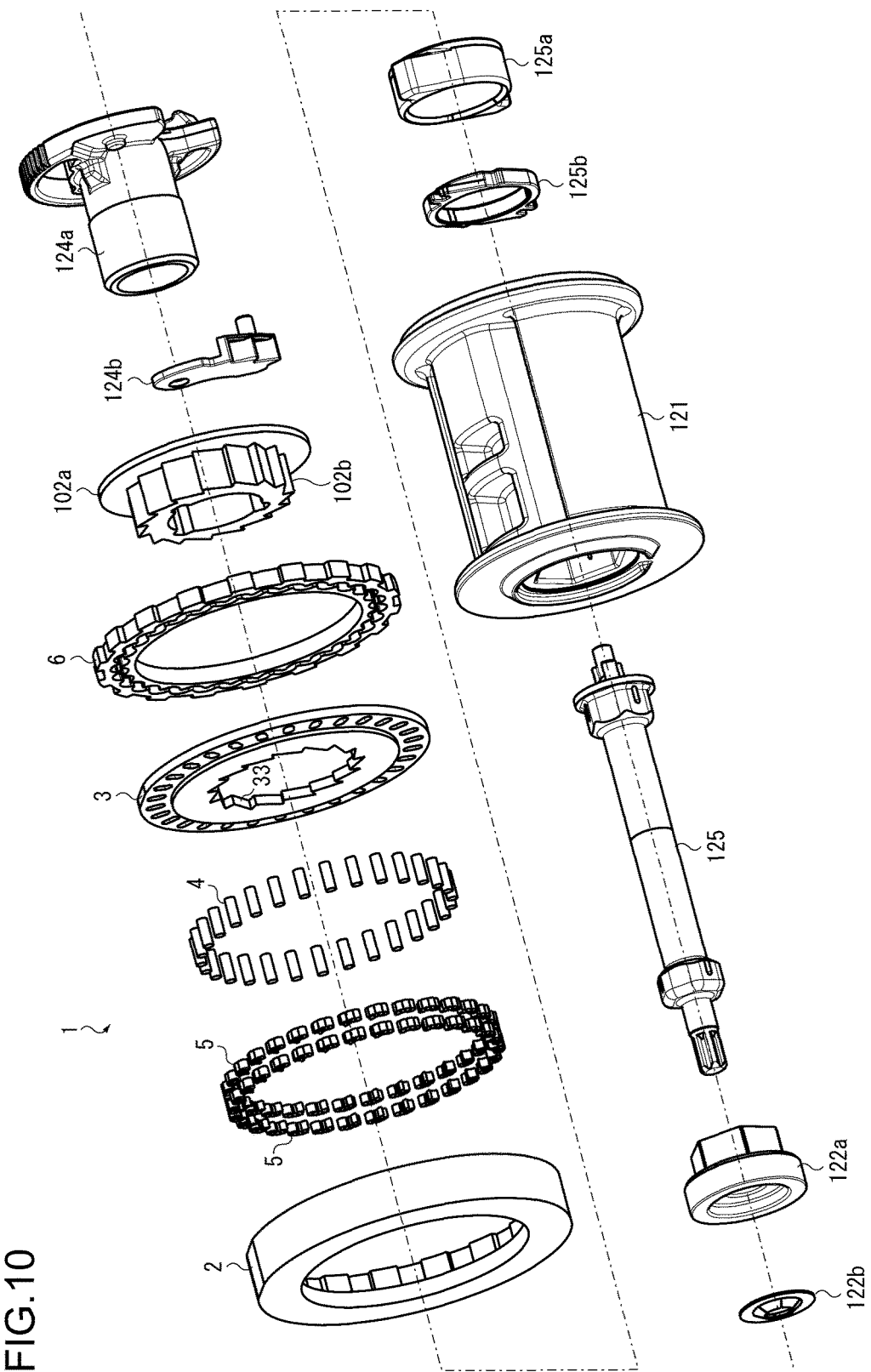
FIG. 10 is a development view of component parts, showing a shaft unit of the seatbelt retractor shown in FIG. 9.

Next, a seatbelt retractor and a seatbelt apparatus that include an energy absorption apparatus 1 described above will be described with reference to FIG. 8 to FIG. 10. Note that FIG. 8 is an overall construction diagram showing a seatbelt apparatus according to this embodiment. FIG. 9 is a sectional diagram of a seatbelt retractor according to this embodiment. FIG. 10 is a development view of component parts, showing a shaft unit of the seatbelt retractor shown in FIG. 9.

A seatbelt apparatus 100 shown in FIG. 8 includes a webbing 101 that restrains an occupant (not shown) to a seat S, a seatbelt retractor 102 that retracts the webbing 101, a guide anchor 103 that is provided on a vehicle body side and that guides the webbing 101, a belt anchor 104 that fixes the webbing 101 to the vehicle body side, a buckle 105 disposed on a side surface of the seat S, and a tongue 106 disposed on the webbing 101.

The graphically shown seatbelt apparatus 100 is a seatbelt apparatus for a so-called passenger seat. In many cases, a pillar P is disposed at a location adjacent to the seat S. Then, for example, the seatbelt retractor 102 is disposed within the pillar P and the guide anchor 103 is disposed on a surface of the pillar P. The foregoing seatbelt apparatus 100 can restrain an occupant to the seat S with the webbing 101 by pulling out the webbing 101 and fitting the tongue 106 to the buckle 105.

Incidentally, constructions of the above-described seatbelt apparatus 100 other than the seatbelt retractor 102 are substantially the same as those of the conventional seatbelt apparatuses and, therefore, detailed descriptions thereof are omitted herein. Furthermore, the seatbelt apparatus 100 is not limited to apparatuses for passenger seats but may also be a seatbelt apparatus for a driver's seat and may also be a seatbelt apparatus for a rear seat. In a seatbelt apparatus for a rear seat, the guide anchor 103 may be omitted.

The seatbelt retractor 102 shown in FIG. 9 includes a spool 121 that retracts a webbing (not graphically shown) that restrains an occupant, a base frame 122 that rotatably retains the spool 121, and an energy absorption apparatus 1 disposed between the base frame 122 or a component part fixed to the base frame 122 and the spool 121. Incidentally, a shaft unit shown in FIG. 10 is a unit obtained by eliminating from the seatbelt retractor 102 shown in FIG. 8 the base frame 122, a spring means 123 described later, a portion of a lock mechanism 124 described later, and an acceleration sensor 126.

The seatbelt retractor 102 includes a substantially U-shaped base frame 122 that rotatably supports the spool 121, a spring means 123 disposed on one end of the spool 121, a lock mechanism 124 disposed on the other end of the spool 121, a torsion bar 125 inserted in a central portion of the spool 121, and an acceleration sensor 126 that detects acceleration of a vehicle. Incidentally, a pretensioner that, at the time of a vehicle collision or the like, instantaneously retracts the webbing to eradicate space between the occupant and the webbing has been omitted in the figure. The seatbelt retractor 102 according to this embodiment may be provided either with or without a pretensioner.

The spring means 123 has a spring core 123a that forms an axis of a spiral spring (not graphically shown) and a spring cover 123b that houses the spiral spring. An end of the torsion bar 125 is connected to the spring core 123a. The torsion bar 125 is rotatably supported by a bearing 122a that is disposed on the base frame 122. Incidentally, at an outer side of the bearing 122a there may be disposed a fall-out preventing push nut 122b.

The lock mechanism 124 includes a locking base 124a disposed on an end portion of the torsion bar 125, a pawl 124b disposed on the locking base 124a so as to be oscillatable, a lock gear 124c disposed on the end portion of the torsion bar 125 so as to be adjacent to an outer side of the locking base 124a, a flywheel 124d disposed on the lock gear 124c so as to be oscillatable, and a retainer 124e that houses these component parts and the rotationally supports the torsion bar 125.

The acceleration sensor 126 is disposed adjacent to the lock mechanism 124 and has a projection 126a that is engageable with a tooth that is formed on an outer periphery of the lock gear 124c upon detection of an acceleration that occurs on the vehicle due to collision of the vehicle or the like.

When the acceleration sensor 126 detects an acceleration that occurs on the vehicle due to collision of the vehicle or the like, the rotation of the lock gear 124c is restrained, so that the flywheel 124d oscillates. The flywheel 124d is constructed so as to be able to oscillate the pawl 124b as the flywheel 124d itself oscillates. The oscillated pawl 124b protrudes radially outwards of the locking base 124a and engages with a tooth formed on an opening portion of the base frame 122. Because of this engagement of the pawl 124b, the locking base 124a becomes at a state of being fixed to the base frame 122.

In the case where, during the state in which the lock mechanism 124 has operated (the state in which the locking base 124a has been fixed to the base frame 122), the webbing is further pulled out and a predetermined load occurs, then the spool 121 connected to the webbing rotates relative to the locking base 124a. At this time, the torsion bar 125 is twisted so that energy occurring on the webbing is absorbed. Incidentally, the maximum-twist number of rotations of the torsion bar 125 is determined by a stopper 125a that is fitted to the outer periphery of a shaft portion of the locking base 124a, and rupture of the torsion bar 125 is restrained. Furthermore, a collar 125b for preventing rattling may be disposed between the stopper 125a and the spool 121.

As for the description of the seatbelt retractor 102 given hereinbefore, substantially the same constructions as related seatbelt retractors described in, for example, Japanese Unexamined Patent Application Publication No. 2012-30636, are provided; therefore, further detailed descriptions will be omitted.

The seatbelt retractor 102 according to this embodiment includes, in addition to the above-described constructions, a fixed ring 102*a* fixed to the locking base 124*a* and an energy absorption apparatus 1 disposed between the spool 121 and the fixed ring 102*a*. As shown in FIG. 9, the first plate 2 of the energy absorption apparatus 1 is fixed to the spool 121 and the second plate 3 is fixed to the fixed ring 102*a*. Incidentally, as shown in FIG. 10, on an inner peripheral surface of the second plate 3 there are formed internal teeth 33. On the fixed ring 102*a* there are formed external teeth that engage with the internal teeth of the clutch plate 5.

Therefore, in the case where the lock mechanism 124 operates so that relative rotational motion occurs between the locking base 124*a* and the spool 121, the second plate 3 and the first plate 2 undergo relative rotational motion. As a result, the energy absorption apparatus 1 operates to absorb energy occurring on the webbing.

The graphically shown seatbelt retractor 102, because of including the torsion bar 125 fixed to the bearing 122*a*, is constructed so that the energy absorption apparatus 1 operates simultaneously with operation of the torsion bar 125. By using both the energy absorption apparatus 1 and the torsion bar 125 in this manner, the burden on the energy absorption apparatus 1 can be reduced and size reduction and weight reduction of the energy absorption apparatus 1 can be sought.

Generally, in a vehicle, occupants of large builds (men, for example) and small builds (women, children, for example) will ride. A conventional seatbelt retractor 102 that has only a torsion bar operates uniformly in the case where a predetermined load occurs, regardless of whether the occupant is an occupant of a large build or an occupant of a small build. For example, in the case where an occupant of a large build is riding in a vehicle, forward movement of the occupant's upper body caused by collision of the vehicle or the like would not be easy to decelerate, and in the case where an occupant of a small build is riding in a vehicle, forward movement of the occupant's upper body caused by collision of the vehicle or the like would be easy to decelerate.

Therefore, if the conditions for operation of the torsion bar are to be set in accordance with occupants of large builds and occupants of small builds, it is necessary to separately mount sensors or the like for determining the build of an occupant. In contrast, in the seatbelt retractor 102 equipped with the energy absorption apparatus 1 according to the embodiment described above, the energy absorption amount can be increased and decreased according to the relative rotation speed; therefore, without a need to mount a sensor or the like for determining the build of an occupant, the energy absorption amount can be increased and decreased in accordance with the withdraw speed of the webbing commensurate with the build of an occupant.

Although in conjunction with the foregoing embodiments, the case where the torsion bar 125 is provided has been described, the torsion bar 125 can be omitted. For example, if a shaft (not graphically shown) made of metal or made of resin which has substantially the same shape as the torsion bar 125 is prepared and this shaft is configured to be freely rotatable relative to the bearing 122*a*, the spool 121 can be caused to rotate relative to the shaft even in the case where the lock mechanism 124 operates. In the foregoing construction, too, the energy absorption apparatus 1 can be caused to operate by relative rotational motion of the locking base 124*a* and the spool 121.

Furthermore, the seatbelt retractor 102 is not limited to the graphically shown constructions; for example, the first plate 2 may be fixed to the locking base 124*a* and the second plate 3 may be fixed to the spool 121. Furthermore, instead of the first plate 2, the third plate 6 may be fixed to the spool 121 or the locking base 124*a*.

The present invention is not limited to the above-described embodiments. For example, the energy absorption apparatus 1 mounted in the seatbelt retractor 102 may be the energy absorption apparatus 1 according to the second embodiment or may also be the energy absorption apparatus 1 according to the third embodiment, and so on. It goes without saying that the present invention can be changed in various manner without departing from the gist of the present invention.

The invention claimed is:

1. An energy absorption apparatus disposed between objects that rotate relative to each other, the energy absorption apparatus comprising:
   a first plate connected to one of the objects and having a wave-shaped groove formed in an annular shape;
   a second plate connected to another one of the objects, disposed so as to be adjacent to the first plate, and having a plurality of radial grooves formed at locations that face the wave-shaped groove;
   a plurality of driving pins that are inserted, at one end, in the wave-shaped groove and inserted, at another end, in the radial grooves; and
   a plurality of follower bodies that are housed in the wave-shaped groove or the radial grooves and that slide along the wave-shaped groove or the radial grooves as the driving pins move.

2. The energy absorption apparatus according to claim 1, wherein the follower bodies housed in the wave-shaped groove are a single component part or a plurality of component parts filling space between the driving pins.

3. The energy absorption apparatus according to claim 2, wherein the follower bodies have a cross section with a crescent shape.

4. The energy absorption apparatus according to claim 1, wherein the follower bodies housed in the radial grooves are component parts having a hexahedral shape that are fixed to the driving pins.

5. The energy absorption apparatus according to claim 1, further comprising a third plate that is fixed to the first plate so that the second plate is sandwiched therebetween and that has an auxiliary wave-shaped groove that is disposed so as to have the same shape and the same phase as the wave-shaped groove, wherein the radial grooves are formed in the second plate so as to extend through the second plate; the driving pins, at another end, extend through the radial grooves and are inserted into the auxiliary wave-shaped groove; and the follower bodies are housed in both the wave-shaped groove and the auxiliary wave-shaped groove.

6. A seatbelt retractor having a spool that retracts a webbing for restraining an occupant and a base frame that rotatably retains the spool, the seatbelt retractor comprising an energy absorption apparatus disposed between the base frame or a component part fixed to the base frame and the spool, wherein the energy absorption apparatus is the energy absorption apparatus according to claim 1.

7. A seatbelt apparatus having a webbing that restrains an occupant to a seat, a seatbelt retractor that retracts the webbing, a belt anchor that fixes the webbing to a vehicle body side, a buckle disposed on a side surface of the seat, and a tongue disposed on the webbing, wherein the seatbelt retractor is the seatbelt retractor according to claim 6.

* * * * *